Patented Dec. 9, 1941

2,265,949

UNITED STATES PATENT OFFICE 2,265,949

RECOVERY OF POTASSIUM ALKOXIDE CONDENSING AGENTS

Donald J. Loder, Donald D. Lee, and William F. Gresham, Wilmington, Del., assignors to E. I. du Pont de Nemours & Company, Wilmington, Del., a corporation of Delaware No Drawing. Application March 28, 1940, Serial No. 326,426

9 Claims. (Cl. 260—643)

This invention relates to organic condensation reactions generally and more particularly to such reactions which employ metal alkoxides, the invention being directed especially to the use and recovery of potassium alkoxide condensing agents.

Since the work of Geuther, in 1863, on the action of sodium with acetic acid esters and the subsequent work of Claisen and others, who explained more fully the mechanism of the reaction, a large number of processes have been developed utilizing the fundamental "ester-condensation" principles. As condensing agents for these reactions, there have been proposed and used metallic sodium, sodamide and sodium alkoxides, as well as the corresponding compounds of the alkali metals and alkaline earth metals. These syntheses and condensing agents have been of inestimable assistance to the organic chemist, enabling him to synthesize a great number of compounds which, prior to the advent of the aceto-acetic ester technique, could not be made synthetically. While these syntheses have been of great value to the organic chemist in enabling him to effectively extend his efforts, the work was and has been, by and large, of an experimental and academic nature, for the reason that the condensing agents used, had to be employed in substantially molecular proportions, and were difficult, if not impossible, to wholly recover from the reaction products. The cost of aceto-acetic ester syntheses and related syntheses, consequently has relegated them to academic research mainly and to commercial processes only when uses were found which would bear the high costs.

An object of the present invention is to provide a process for the recovery and reuse in organic synthesis reactions of potassium alkoxide condensing agents. A further object is to provide a process for the recovery of potassium alkoxides from reaction mixtures containing them. Yet another object is to provide a process for use in syntheses involving the aceto-acetic ester reaction and other reactions, wherein potassium alkoxide condensing agents are employed, and whereby such agents are recovered from the reaction product and reconverted to potassium alkoxide condensing agents for reuse. Other objects and advantages of the invention will hereinafter appear.

The process of the invention is for use in organic reactions wherein alkali metal or alkaline earth metal condensing agents, their amides, or alkoxides are employed, and more especially in reactions which employ as the condensing agent, a potassium alkoxide. In such reactions, and after the reaction has proceeded to the desired product or for the prescribed period of time, carbon dioxide is bubbled into the reaction mixture in order to convert the potassium alkoxide, for example, to a potassium alkyl carbonate, whether it is present as the alkoxide or in combination with other compounds present in the reaction mixture. The alkyl carbonate is then separated from the reaction mixture by any suitable means, is hydrolyzed to potassium acid carbonate and heated to reconvert it to potassium carbonate, which is subsequently extracted with methanol to form potassium methoxide and potassium acid carbonate, the latter being returned to the aforesaid heating stage, and the potassium alkoxide condensing agent recovered for reuse. By this cycle of reactions, hereinafter referred to as the potassium alkoxide cycle, it is apparent that one can carry out reactions of this general nature without substantial loss of the condensing agent. Thus applicant has provided a most economical method for conducting these reactions, since the high costs of the condensing agent have been substantially eliminated.

A number of more representative reactions will now be given in order to illustrate the scope of the invention and to designate both generic and specific types of organic syntheses in which the potassium alkoxide cycle may be carried out with advantage.

I. Condensation of esters with compounds containing active hydrogen atoms:

(A) Aceto-acetic ester synthesis from simple esters such as the aliphatic organic acids; for example, acetic, propionic, and butyric acids.

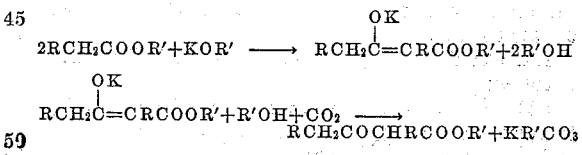

(Where R and R' are alkyl groups such as methyl, ethyl, etc.)

(B) Condensation of methyl formate or carbon monoxide with esters or other compounds containing active hydrogen atoms.

XOCH₂COOY+ROH+3CO+KOR→
    XOC(CHOK)COOY+2HCOOR
XOC(CHOK)COOY+ROH+CO₂→
    XOCH(CHO)COOX+KRCO₃

(Where X, Y, and R are similar or dissimilar alkyl groups, or may be an alkoxy methylene group such as methoxy methylene.)

(C) Synthesis of tartaric esters and tartaric ether esters from oxalic esters and ether esters of hydroxy acetic acid.

(1) (COOR)₂+ROCH₂COOR+KOR→
    ROOC—COK=CORCOOR+2ROH
ROOCCOK=CORCOOR+ROH+CO₂→
    ROOCCOCHORCOOR+KRCO₃

(2) (COOR)₂+ROCH₂OCH₂COOR+KOR→
    ROOCCOK=COCH₂ORCOOR+2ROH
ROOCCOK=COCHORCOOR+ROH+CO₂→
    KRCO₃+ROOCCOCHOCH₂ORCOOR (Where R is an alkyl group.)

II. Condensation of nitriles:

(A) Dimerization of adiponitrile to cyclic iminonitriles:

(B) Dimerization of simple nitriles such as acetonitriles, propiononitriles, alkoxy-acetonitriles, and (alkoxy alkoxy) acetonitriles to the corresponding iminonitrile.

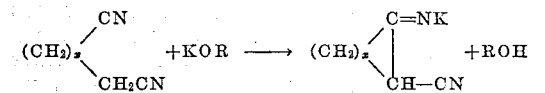
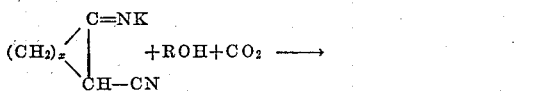

(Where R is hydrogen, hydrocarbon, or substituted hydrocarbon, alkoxy, aryloxy, alkoxy alkoxy, or aryloxy alkoxy radical.)

(C) Condensation of nitriles with compounds containing active hydrogen atoms.

RCOOR″+R′CH₂CN+KOR″ ⟶
    R—COK=CR′CN+2R″OH
R—COK=CR′CN+R″OH+CO₂ ⟶
    RCOCHR′CN+KR″CO₃

(Where R and R' are hydrogen, alkyl, aryl, substituted hydrocarbon, alkoxyalkyl, or alkoxy alkoxy alkyl radicals and R″ is alkyl, aralkyl, or an aryl radical.)

III. Condensation of esters of nitriles with ketones:

(A) Reaction of carbon monoxide or an alkyl formate with cyclohexanone to give formyl cyclohexanone.

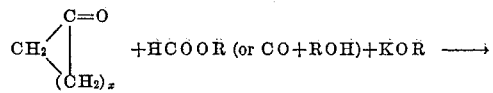
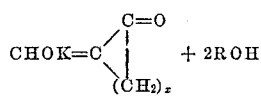
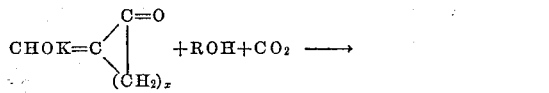
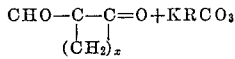

(Where x represents an integer greater than one.)

(B) Condensation of oxalic acid esters with cyclohexanone.

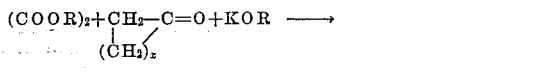
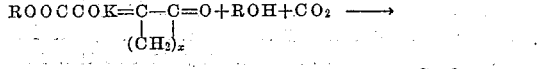
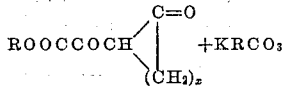

(Where x is an integer greater than one.)

(C) Condensation of adipic acid esters or adiponitrile with simple ketones such as acetone.

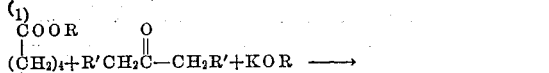
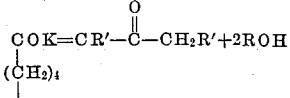
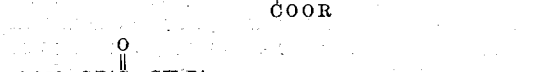
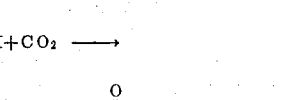

IV. Condensation of esters or nitriles with aldehydes.

(1) RCH₂COOR′+RCH₂CHO+KOR′ ⟶
    RCH₂COK=CRCHO+2R′OH
RCH₂COK=CRCHO+R′OH+CO₂ ⟶
    RCH₂CO—CHRCHO+KR′CO₃

(2) RCH₂CN+RCH₂CHO+KOR′ ⟶
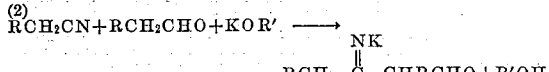
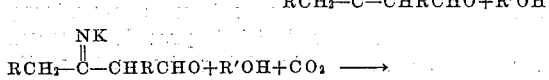

(Where R is hydrogen, alkyl, aryl, aralkyl, alkoxy, or an alkoxy alkoxy radical.)

V. Condensation of esters or nitriles such as methyl formate or adiponitrile with aromatic compounds containing active hydrogen atoms.

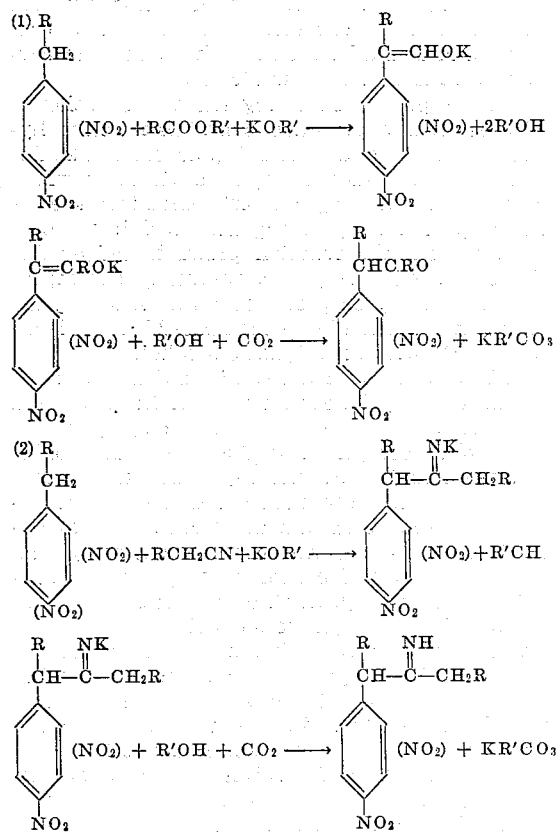

(Wherein R is hydrogen, hydrocarbon, substituted hydrocarbon, alkoxy methyl, or an alkoxy alkoxy methyl radical.)

The equations given illustrate the general applicability of the potassium alkoxide cycle and it may be stated in summarizing these reactions that the cycle is applicable to the condensation of esters with aldehydes, hydrocarbons, nitriles, esters, and ketones; the condensation of nitriles with esters, nitriles, aldehydes, hydrocarbons, and ketones; and the condensation of esters with cyclic ketones such as cyclohexanone.

The more detailed practice of the invention is illustrated by the following examples in which parts given are by weight unless otherwise stated. There are, of course, many forms of the invention other than these specific embodiments. The examples are numbered and lettered to conform with the numbering and lettering of the reactions already designated, the examples illustrating the reactions directly referred to.

*Example I (I-A).*—A reaction mixture consisting of 140 parts of potassium methoxide, 298 parts of methanol, and 208 parts of methyl methoxyacetate was charged into a reaction vessel capable of withstanding high pressures. Carbon monoxide was introduced to give 700 atmospheric pressure and the mixture was agitated for one hour while maintaining the temperature at 25-30° C. The product, a slurry, was suspended in methyl formate containing an equimolar quantity of methanol and treated with carbon dioxide. On removing potassium methyl carbonate and methyl formate, methyl (methoxy) formyl-acetate, a viscous liquid, was obtained in 93% yield.

*Example II (I-B).*—An equimolar mixture of methyl methoxy acetate, $CH_3OCH_2COOCH_3$, and potassium methylate dissolved in 3 moles of methanol was reacted in the presence of carbon monoxide under a pressure of approximately 200 atmospheres and at a temperature between 25 and 30° C. for approximately 1 hour. Carbon dioxide was then bubbled into the reaction mixture, and the potassium methyl carbonate separated from the resulting product by filtration. This methyl carbonate was hydrolyzed and subsequently heated and the resulting potassium carbonate extracted with methanol. The undissolved salts were separated by filtration from the extract and the potassium methoxide recovered by concentration for reuse. The methyl formyl methoxy acetate was obtained in accord with the aceto-acetic ester synthesis in good yield. It was a viscous polymeric liquid which, on heating, depolymerized. It distilled at 50-55° C. and at 3 mm. pressure.

*Example III (II-A).*—To 0.4 mole of powdered, methanol-free potassium methoxide cooled to 0° C. was added 0.8 mole of (isobutoxymethoxy) acetonitrile dropwise with cooling and stirring. After standing overnight, most of the potassium methoxide had dissolved forming a brown viscous material. Methanol produced was removed under highly reduced pressure and 30-40° C. to force the reaction nearer to completion. The reaction product was suspended in dry ether and treated with 40 g. of methanol and a stream of carbon dioxide. Potassium methyl carbonate thus precipitated, was removed by filtration and the ether solvent was evaporated on a steam bath. The product, 1.3-di-(isobutoxy methoxy)-2-iminobutyronitrile, was obtained as a viscous liquid.

*Example IV (III-A).*—In a three-necked flask equipped with stirrer, reflux condenser, and dropping funnel were placed 70 parts of dried potassium methoxide and 223 parts of methyl formate. A mixture consisting of 98.7 parts of cyclohexanone and 351.5 parts of methyl formate was added over a period of 4.5 hours while maintaining the temperature at 0° C. After the reaction product, a slurry, stood overnight, it was treated with gaseous carbon dioxide. On removing potassium methyl carbonate and methyl formate, formylcyclohexanone (B. P. 87° C./10 mm.) was obtained in 60% yield.

The examples illustrate the potassium alkoxide cycle wherein the reaction product is treated with gaseous carbon dioxide to convert the potassium present as an alkoxide or other compound, to a potassium alkyl carbonate, which is filtered from the reaction mixture and after drying is hydrolyzed and then heated to convert it to potassium carbonate. The carbonate may then be leached with an alcohol to reform the potassium alkoxide condensing agent. The extract, if required, is concentrated and the potassium alkoxide contained therein subsequently recovered from the concentrate. A more detailed process for the conversion of potassium carbonate to a potassium alkoxide is described in the copending application of Loder et al. S. N. 280,308.

In addition to the potassium methoxide above specifically described, the invention may be used with other potassium alkoxides such as, for example, potassium ethoxides, propoxide, butoxide, and the alkoxides of the higher straight and branched chain alcohols.

It has been found satisfactory to add the gaseous $CO_2$ at ordinary or raised pressures and at temperatures ranging between 0° C. and 50° C.

The potassium alkyl carbonates precipitate upon the introduction of carbon dioxide to the reaction product and can accordingly be readily separated therefrom. The carbonate is readily hydrolyzed at ordinary temperature with the addition of water or at raised temperatures with steam to potassium acid carbonate. This acid carbonate can then be converted to the alkali metal carbonate by heating at a temperature between 100° and 300° C.

We claim:

1. In a process involving organic condensation reactions utilizing potassium alkoxide condensing agents, the steps which comprise introducing carbon dioxide into the reaction product until substantially all of the condensing agent has been precipitated, separating the precipitate, hydrolyzing it, and subsequently heating the hydrolyzed product and leaching the hydrolyzed and heated product with an alcohol to obtain a potassium alkoxide.

2. In a process involving organic condensation reactions utilizing potassium alkoxide condensing agents, the steps which comprise precipitating from the reaction product a potassium alkyl carbonate by the introduction of carbon dioxide, hydrolyzing the potassium alkyl carbonate to potassium acid carbonate, heating the potassium acid carbonate and thereby converting it to potassium carbonate and subsequently leaching the potassium carbonate with an alcohol and thereby obtaining a potassium alkoxide.

3. In a process involving organic condensation reactions utilizing potassium methoxide as a condensing agent, the steps which comprise introducing carbon dioxide into the reaction product, separating the potassium methyl carbonate precipitated therefrom, hydrolyzing the precipitated potassium methyl carbonate to potassium acid carbonate, thermally decomposing the potassium acid carbonate to potassium carbonate and leaching the potassium carbonate with methanol to form potassium methoxide.

4. In a process involving organic condensation reactions utilizing potassium ethoxide as a condensing agent, the steps which comprise introducing carbon dioxide into the reaction product, separating the potassium ethyl carbonate precipitated therefrom, hydrolyzing the precipitated potassium ethyl carbonate to potassium acid carbonate, thermally decomposing the potassium acid carbonate to potassium carbonate and leaching the potassium carbonate with ethanol to form potassium ethoxide.

5. In a process involving the condensation of organic esters with compounds containing active hydrogen atoms wherein a potassium alkoxide condensing agent is used, the steps which comprise introducing carbon dioxide into the reaction product, separating the precipitated potassium alkyl carbonate therefrom, hydrolyzing the potassium alkyl carbonate to potassium acid carbonate, thermally decomposing the potassium acid carbonate to potassium carbonate, and finally, leaching the potassium carbonate with an aliphatic alcohol.

6. In a process involving the condensation of nitriles with compounds containing active hydrogen atoms and wherein potassium alkoxide condensing agents are employed, the steps which comprise introducing carbon dioxide into the reaction product, separating the precipitated carbonate from the reaction product, hydrolyzing the separated precipitate, thermally decomposing the hydrolyzed precipitate, and leaching the resulting thermally decomposed hydrolyzed precipitate with an aliphatic alcohol.

7. In a process for the condensation of organic esters with cyclohexanone, wherein potassium alkoxide condensing agents are employed, the steps which comprise introducing carbon dioxide into the reaction product, separating the precipitated potassium alkyl carbonate therefrom, hydrolyzing the potassium alkyl carbonate to potassium acid carbonate, thermally decomposing the potassium acid carbonate to potassium carbonate, and finally, leaching the potassium carbonate with an aliphatic alcohol.

8. In a process involving organic condensation reactions wherein potassium alkoxide condensing agents are employed, the steps which comprise introducing carbon dioxide into the reaction product, separating the potassium alkyl carbonate therefrom, hydrolyzing the potassium alkyl carbonate to potassium acid carbonate, thermally decomposing the potassium acid carbonate to potassium carbonate, and subsequently leaching the potassium carbonate with an alcohol and returning the potassium acid carbonate residue remaining after the leaching process to the thermal decomposition step.

9. In a process involving organic condensation reactions, utilizing potassium alkoxide condensing agents, the steps which comprise introducing gaseous carbon dioxide into the reaction mixture at a temperature between 0 and 50° C., separating by filtration the potassium alkyl carbonate, hydrolyzing, after the addition of water, the potassium alkyl carbonate to potassium acid carbonate, thermally decomposing at a temperature between 100° and 300° C. the potassium acid carbonate to potassium carbonate, and finally, leaching the potassium carbonate thus obtained with an aliphatic alcohol to obtain a potassium alkoxide.

DONALD J. LODER.
DONALD D. LEE.
WILLIAM F. GRESHAM.